May 6, 1969  L. GOTTFRIED ET AL  3,442,527
DETACHABLE JUVENILE UTILITY ASSEMBLY
Filed Aug. 4, 1966
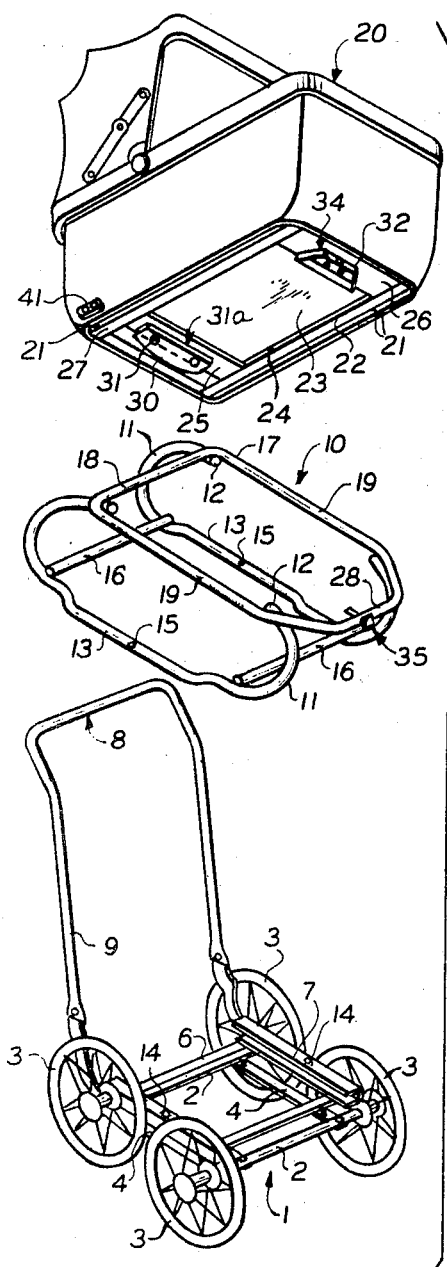
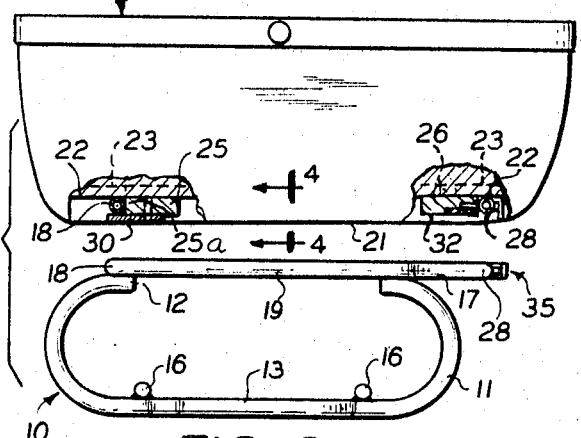
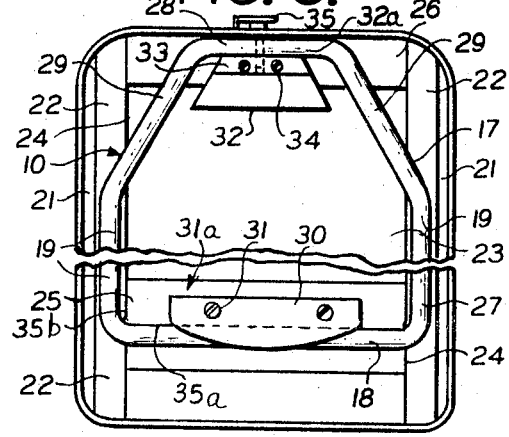
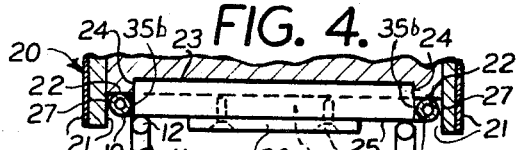
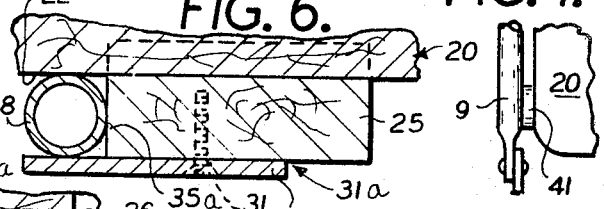
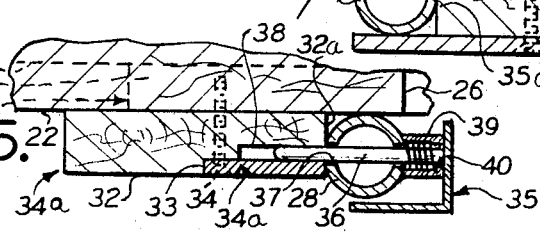
INVENTORS
LOUIS GOTTFRIED
JACOB BERGER
BY
ATTORNEY.

United States Patent Office 3,442,527
Patented May 6, 1969

3,442,527
DETACHABLE JUVENILE UTILITY ASSEMBLY
Louis Gottfried, 515 West End Ave., New York,
N.Y. 10024, and Jacob Berger, 600 W. 264th St.,
Bronx, N.Y. 10471
Filed Aug. 4, 1966, Ser. No. 570,360
Int. Cl. B62b 7/14, 7/12
U.S. Cl. 280—47.41                       5 Claims

ABSTRACT OF THE DISCLOSURE

A convertible and detachable utility assembly comprising a lower base member, an intermediate support member including an upper portion and a lower portion, an upper utility member, means secured to the lower member for releasably connecting the leg portion to the lower member, and connecting means for rigidly but releasably connecting the upper portion of the intermediate support member to the upper utility member. The connecting means comprises side ridges depending from the bottom of the upper utility member along the outermost sides thereof. A hook member is immovably secured to the bottom adjacent one end of the bottom between the side ridges and faces a substantially longitudinal direction relative to the side ridges, the hook member extending substantially in the lateral direction. An abutting member is secured to the bottom adjacent the other end of the bottom between the side ridges and has an abutting face substantially facing in the longitudinal direction opposite to the facing of the hook member. The upper portion of the intermediate support member comprises a longitudinal member including side arm portions and lateral end portions, and the hook member engages one of the lateral end portions and the abutting face of the abutting member for juxtaposition to the other lateral end portion of the side ridges juxtaposed to the side arm portions. A releasable rocking means is provided for rigidly but releasably affixing the other lateral end portion in juxtaposition to the abutting face.

---

The present invention relates to a child's detachable utility assembly, in general, and to a convertible and readily detachable utility member, support member and base member assembly, in particular.

Convertible and detachable utility member assemblies are known in general, but have not been entirely satisfactory as they are either relatively difficult to assemble and disassemble or are expensive or bulky, may disengage during normal use, or are not able to provide the required flexibility for the utility member, as for example, the rocking of a baby carriage, without greatly increasing the possibility of accidental disengagement.

It is one object of the present invention to provide a convertible and readily detachable utility assembly having none of the aforesaid disadvantages.

It is another object of the present invention to provide a convertible and detachable child utility assembly comprising, a lower base member, which may include, for example, a moving gear member; an intermediate support member comprising an upper portion and a leg portion; and, an upper utility member which, for example, may be a carriage body, baby chair, bassinet, etc., wherein said intermediate support member is releasably connected at the leg portion to the lower base member and the upper portion of the intermediate support member is easily and rigidly but releasably connected to the upper utility member by a connecting means. The intermediate support member with its leg portion and its upper portion and said corresponding connecting means for rigidly but releasably connecting the upper portion to the utility member, provides, when combined with various lower base members and utility members, the advantages of the invention indicated herein.

It is still another object of the present invention to provide a convertible and readily detachable child utility assembly according to the previously stated objective, wherein said intermediate support member comprises simple bar construction which readily is securely and releasably connected to the lower base member and rigidly and releasably connected by the connecting means, to the utility member. Where the upper member is, for example, a baby carriage body, the intermediate support member additionally functions as a carriage chassis.

It is yet another object of the present invention to provide a convertible and detachable child utility assembly in accordance with the previously stated object wherein the connecting means for releasably connecting said upper portion of the intermediate support member to the utility member comprises side ridges depending from the bottom of the upper utility member along the sides thereof; a laterally extending hook member secured to the bottom near one end of said bottom between said side ridges, with the hook member facing in a substantially longitudinal direction relative the sides; and, an abutting member secured to the bottom adjacent the other end between the side ridges and having an abutting face substantially facing in the longitudinal direction opposite to the facing of the hook member. The upper portion of the intermediate support member also includes a bar frame with side arm portions and lateral end portions. When connected to the bottom of the upper utility member, one of the lateral end portions engages the hook member and the other lateral end portion is juxtaposed to the abutting face of the abutting member, and the side arm portions are in juxtaposition to the side ridges.

With this arrangement, the upper portion of the intermediate member may readily be hooked to the utility member and pivoted into locking position. The connecting means is further provided with a releasable locking means for securely affixing the other lateral end portion in juxtaposition to the abutting face, thereby securely locking the members.

With these and other objects in view which will become apparent in the following detailed description, the present invention will be clearly understood in connection with the accompanying drawings, in which:

FIGURE 1 is an exploded perspective view of a running gear unit, chassis and carriage body assembly;

FIG. 2 is an exploded side elevation of the carriage body and intermediate supporting member;

FIG. 3 is a bottom plan view of the carriage body, and the intermediate supporting member;

FIG. 4 is a section along the lines 4—4 of FIG. 2;

FIG. 5 is an enlarged section of the front portion of the connection between the intermediate supporting member and the carriage body of FIG. 2;

FIG. 6 is an enlarged section of the rear portion of the connection between the intermediate supporting member and the carriage body of FIG. 2; and FIG. 7 is a fragmentary view of the bushing between the carriage body and the pusher-handle arms in the assembled position.

Referring now to the drawings, and in particular to FIG. 1, it will be seen that the detachable assembly comprises a lower base member 1, herein illustrated as a running gear, which includes two axles 2, each having two wheels 3. Two longitudinally disposed bars 4 connect the axles 2 adjacent the wheels 3. Two vertically extending springs 5 are provided on the upper face of the bars 4 adjacent the axles 2, which springs 5 support two laterally disposed cross-bars 6. The ends of cross-bars 6 in turn support two U-shaped, inwardly facing channel members 7, each of the latter extending along the side of the unit near the wheels 3. An upwardly extending pusher-handle 8 having parallel arms 9 is connected to the rear ends of the channel members 7 for moving the running gear 1.

An intermediate support member 10, also identifiable as a chassis for the carriage illustration herein, is provided, and which is capable of being engaged by the channel members 7 of the moving gear 1, in secure, but releasable engagement. The intermediate support member 10, or chassis as it will hereinafter be referred to, comprises two tubular side members 11, which extend from top ends 12 and curve downwardly, being horizontally bent outwardly at flat leg portions 13 for mating engagement in the inwardly facing U-shaped channel members 7. The flat leg portions 13 of the chassis 10 are readily slid horizontally into the channel members 7, to provide engagement therewith; and a spring biased bolt 14, which locks the members longitudinally, is provided in the channel members 7, which bolt 14 is received by a complementary opening 15 in the leg portion 13 of the chassis 10 for securely but releasably locking the members. The chassis member 10 further includes two lateral bars 16, disposed across and preferably welded to the side members 11 of the chassis 10 at the lower reaches of the curved portions of the side members 11. The entire chassis 10 is preferably constructed of tubular material.

The upper portion 17 of the chassis comprises a closed hexagonal frame, including a rear arm portion 18, and two parallel side arm portions 19. The upper portion 17 is welded in horizontal position at the end corners of the side arm portions 19, to the top ends 12 of the side members 11. The upper portions 17 of the chassis 10 is designed to readily connect and lock into the upper utility member 20, herein illustrated as a carriage body 20, but not limited thereto. With the weight of the carriage body 20 on the upper portion 17 of the chassis 10, when connected thereto, the side members 11 can resiliently compress, deriving resilient strength from the curved portions thereof. In cooperation with the aforementioned spring mounted cross-bars 6, a carriage rocking motion comprising three degrees of freedom may be achieved during normal use, while the carriage body 20, chassis 10 and moving gear member 1 are securely and rigidly locked together as will hereinafter be described in greater detail and as will more clearly be understood and appreciated when the ready and secure detachable locking of the structure of the present invention is more fully described.

Referring now again to the drawings and particularly to FIGS. 1, 3 and 4, of the bottom locking construction of the carriage member 20, the bottom of the carriage body 20 includes depending side ridges 21. The bottom of the carriage body 20 adjacent each side ridge 21 is formed into a flat, partially raised, narrow floor portion 22 (FIG. 4); and adjacent thereto, and therebetween, the bottom forms a further recessed upper central floor portion 23 bounded by vertical sides 24.

A rear wooden board 25 and a front wooden board 26 are secured between the vertical sides 24 near the rear and front ends, respectively, of the carriage body 20. The rear wooden board 25 depends downwardly beyond the level of the narrow floor portion 22, as may be seen in FIGS. 2, 4 and 6, defining with the side ridges 21 (FIG. 4) and with the narrow floor portion 22, a channel region 27 substantially equal to the diameter of the side arm portions 19 of the chassis 10, which as will be further explained hereinafter, fit therein. As may readily be seen from FIG. 5, the front wooden board 26 depends from the bottom of the carriage down to the level of the floor portion 22. The front wooden board 26 cannot extend to below the level of the floor portion 22, because the carriage body 20, which is level when locked to the horizontally disposed upper portion 17 of the chassis 10, to be hereinafter described, would otherwise not be level. That is, when the carriage body 20 is locked to the upper portion 17 of the chassis 10, the side arm portions 19, support and abut the floor portions 22; and since the front board 26 is directly above the shorter arm portions of the upper portion 17 of the chassis 10, namely, front arm portion 28 and angular arm portions 29 (FIG. 3), the bottom of the carriage body 20 would be higher at the front, if the front board 26 extended lower than the level of the floor portion 22.

Referring again to the drawings and to FIGS. 5 and 6, a plate 30, preferably of metal, is secured by screws 31 to the bottom of the rear wooden board 25, overlapping the board 25 in the rearward direction and forming therewith a rearwardly facing and laterally extending hook member 31a. The distance which the rear board 25 depends below the floor portion 22 is selected to be substantially equal to the outer diameter of the tubing of the chassis 10. In this manner, the side arm portions 19 of the chassis 10 can fit snugly in the region 27 when, as will be described, rear arm portion 18 is hooked on to the hook member 31a, abutting the upper side of the plate 30.

A preferably wooden trapezoidal member 32 is rearwardly secured to the front wooden board 26, defining with its shortest parallel side an abutting face 32a adjacent the bottom portion of the front wooden board 26. The bottom of the trapezoidal member 32 is recessed and a thin plate 33, preferably of metal is secured in the recess to the trapezoidal member 32 by screws 34, which screws 34 also fasten the trapezoidal member 32 to the front wooden board 26. Front wooden board 26, trapezoidal member 32 and plate 33 together form an abutting member 34a.

Referring now again to the drawings and in particular to FIGS. 1–6, when it is desired to lock the carriage body 20 onto the chassis 10, the rear arm portion 18 of the chassis 10 is hooked over the plate 30 against the rear face 35a of the rear wooden board 25. The bottom of the carriage body 20 and the side arm portions 19 of the chassis 10 are then pivoted together. The side arm portions 19 are received by the channels 27 (FIGS. 3 and 4) defined by side ridges 21, the lateral end sides 35b of the rear wooden board 25 and the floor portion 22. The side arm portions 19 along the side ridges 21 abut the floor portions 22 of the carriage member 20 supporting the carriage body. Toward the front of the units, the front wooden board 26 rests on the front arm portion 28 and on the adjacent parts of the angular arm portions 29 of the chassis 10, thereby supporting the carriage body 20 at the front end.

For further support, but primarily to insure locking of the upper portion 17 of the chassis 10 to the carriage bottom, when in the aforedescribed position, a spring biased latch 35 is provided on the front arm portion 28 of the chassis 10. The spring biased latch 35 comprises a bolt 36 extending through a hole 37 in the front arm portion 28 for locking engagement in a corresponding hole 38 in the trapezoidal member 32 at abutting face 32a, which aligns with the bolt 36 when the front arm portion 28 of the chassis 10 is in locking position against the abutting face 32a and the bottom of the front wooden board 26. The latch 35 also comprises a flanged housing 39 containing a spring 40 attached to the bolt which runs through the housing. The spring 40 is biased in the inward direction as shown in FIG. 5. The thin metal plate 33 provides added strength for the hole 38 which is formed in the lower portion of the wooden trapezoidal member 32.

To securely lock the chassis 10 to the carriage body 20, the latch 35 is extended outward as the front arm portion 28 is pivoted into position against the abutting face 32a of the trapezoidal wooden member 32. In this position the bolt 36 is aligned with the hole 38 and is released, thereby entering the hole 38 and securely locking the assembly.

Advantages of the three-part removable assembly just described should now be apparent. The members are readily and quickly assembled and disassembled with a minimum of effort and without any tools. Sturdy, secure and safe engagement and locking are achieved between the parts without possibility of the parts disengaging accidentally in use, and while still providing the support resiliency necessary for rocking or other desired movements of the upper utility member. The assembly is versatile and completely convertible for use with other interchangeable upper members having various uses and providing obvious economies. Furthermore, the chassis members 10 is sufficiently sturdy inhibiting undesired movement in the event the upper member is, for example, a bassinet, or other unit, where movement is not desired. Additionally, the assembly may be conveniently stored in disassembled parts in relatively crowded, or small storage areas. It is especially compact when disassembled and designed for travel in cars or vehicles where close spaces are frequently encountered. A further advantage is apparent from the embodiment illustrated herein where the utility member is a carriage body. Here the usual chassis portion 10 of the carriage body is eliminated (reducing the bulk of the carriage) as the intermediate support member also serves the chassis function.

A special feature of the invention is the intermediate support member, along with the connecting means for rigidly but releasably connecting the upper portion of the intermediate support member to the upper utility member 20. It is light-weight, small and of simple and rigid construction. With it accrues the aforesaid advantages of the invention, viz, that the entire assembly can be easily assembled and disassembled, and yet be securely and safely fastened when assembled while yet providing the resiliency required for normal use of the utility member.

With other than a three member assembly disadvantages are involved. For example, with two part assemblies, consisting of a carriage and chassis, as one combined part, and a moving gear as the other, there is the difficulty of assembly as the carriage with extended bulk and chassis portion must be lifted together. More than a three part assembly is impractical from a view point of economy, safety or ease of assembly.

Further advantages will now be apparent from a consideration of the connection means design for engagement of the intermediate support member 10 to the upper utility member 20. In particular, secure lateral locking of the intermediate support member 10 to the upper member 20 (and to the lower member 1) is achieved without restricting rocking of the carriage when desired. The side ridges 21 and the lateral end sides 35b (FIG. 4) of the rear wooden board 26 downwardly depending from the central floor portion 23 prevent movement between the upper portion 17 of the chassis 10 and the carriage 20, providing a laterally rigid locking connection therebetween. The curved side members 11 of the chassis 10 as well as the spring mounted channel support bars 6 of the lower member 10 offer any desired movements.

Rigid longitudinal locking between the support member 10 and the upper member 20 is also achieved with the present connecting means arrangement. The downwardly projecting rear board 25 (FIG. 6) prevents forward movement of the rear arm portion 18 of the upper portion 17 of the chassis 10 relative the carriage bottom. Similarly, the abutting face 32a (FIG. 5) prevents rearward motion of the front arm portion 28 of the chassis 10. As clearly indicated in FIGS. 2 and 3, the rear arm portion 18 and the front arm portion 28 are held to close tolerance by the abutting face 32a and the rear face 35a of the hook 31a providing the rigid longitudinal locking. Furthermore bouncing and rocking movements between the upper portion 17 of the intermediate support member 10 and the carriage bottom are prevented by the connecting means arrangement. Accordingly, when the entire assembly is locked together, there is no relative movement between the upper portion 17 of the chassis 10 and the bottom of the upper member 20, and hence no possibility of accidental disengagement, even though the chassis 10 is designed for flexibility offering movements desired of the upper member.

Referring once again to the drawings and in particular to FIG. 7, when the carriage, chassis and running gear member are assembled, the pusher arms 9 straddle the carriage therebetween by a small clearance on either side of the carriage. A lateral rubber abutment in the form of a rubber bushing 41 is secured to the sides of the carriage body 20, fitting into the clearance between the pusher arms and the sides of the carriage. During normal use, protection against tipping and lateral rocking is thereby provided, while eliminating banging and abrasion of the arms 9 and carriage 20.

While we have disclosed one embodiment of the present invention, it is to be understood that this embodiment is given by example only and not in a limiting sense.

We claim:

1. A convertible and detachable child utility assembly, comprising
   a lower base member,
   an intermediate support member including an upper portion and a leg portion,
   an upper utility member,
   means secured to the lower member for releasably connecting said leg portion to the lower member,
   connecting means for rigidly but releasably connecting said upper portion of the intermediate support member to said upper utility member,
   said connecting means comprising side ridges depending from the bottom of the upper utility member along the sides thereof,
   a hook member secured to said bottom adjacent one end of said bottom between said side ridges and facing in a substantially longitudinal direction relative to said side ridges, said hook member extending substantially in the lateral direction,
   an abutting member secured to said bottom adjacent the other end of said bottom between said side ridges and having an abutting face substantially facing in the longitudinal direction opposite to said facing of said hook member,
   said upper portion of said intermediate support member comprising a bar frame including side arm portions and lateral end portions,
   said hook member for engaging one of said lateral end portions, and said abutting face of said abutting member for juxtaposition to said other lateral end portion and said side ridges juxtaposed to said side arm portions,
   releasable locking means for rigidly but releasably affixing said other lateral end portion in juxtaposition to said abutting face,
   said bar frame and said bottom are substantially horizontal when said connecting means connects said upper portion of said intermediate support member to said upper utility member,
   said bottom including an upper central floor portion between said side ridges and a partially raised narrow floor portion between each of said side ridges and said central floor portion, and
   said hook member comprising a first board extending laterally across the upper central floor portion adjacent one end of said bottom and depending therefrom a distance below the level of the partially raised narrow floor portion, said distance equal to the cross-section of said bar frame.

2. The convertible and detachable child utility assembly, as set forth in claim 1, wherein
   said abutting member comprises a second board extending laterally across the upper central floor portion adjacent said other end of said bottom and depending therefrom to the level of said partially raised narrow floor portion,
   said abutting member further comprising a block secured to said second board and set back thereon in a direction away from said other end, said abutting face included on said block and facing said other end, said block defining a horizontal hole extending inward from the abutting face thereof, and said releasable locking means comprising a spring biased bolt extending through said other lateral end portion of the bar frame adjacent said horizontal hole for being received by said hole thereby locking said bar frame to said upper frame member, said horizontal hole vertically spaced from said second board the same distance said bolt is spaced from the upper end of said bar frame, said second board thereby contiguous to said bar frame.

3. The convertible and detachable child utility assembly, as set forth in claim 1, wherein said hook member is disposed on said bottom adjacent the rear of the upper utility member and said abutting member is disposed on said bottom adjacent the front of the utility member.

4. The convertible and detachable child utility assembly, as set forth in claim 1, wherein said tubular frame is of a hexagonal shape, said side arm portions being identical and of extended length, said lateral end portions including a rear arm forming right angle end corners with the side arm portions adjacent thereto and including a short front arm parallel to said rear arm, and said rear arm for engagement by said hook member and said front arm for juxtaposition to said abutting face of said abutting member.

5. The convertible and detachable child utility assembly, as set forth in claim 4, wherein said block is of a trapezoidal shape with said abutting face being the shorter parallel side thereof.

References Cited

UNITED STATES PATENTS

| 2,661,508 | 12/1953 | Hubert | 49—463 |
| 2,509,972 | 5/1950 | Gottried | 155—39 |
| 2,512,995 | 6/1950 | Berger | 280—47 |
| 2,643,702 | 6/1953 | Berger | 155—41 |
| 2,823,067 | 2/1958 | Gottfried | 296—35 |
| 3,223,431 | 12/1965 | Gottfried et al. | 280—47.38 |
| 3,288,482 | 11/1966 | Gottfried et al. | 280—47.38 |

LEO FRIAGLIA, *Primary Examiner.*

JOEL E. SIEGEL, *Assistant Examiner.*